US008441534B2

(12) United States Patent
Hubmer et al.

(10) Patent No.: US 8,441,534 B2
(45) Date of Patent: May 14, 2013

(54) ELECTRONIC ARTICLE SURVEILLANCE SYSTEM

(75) Inventors: Paul Hubmer, Hart-Purgstall (AT); Christian Schwar, Graz (AT)

(73) Assignee: NXP B.V., Eindhoven (NL)

( * ) Notice: Subject to any disclaimer, the term of this patent is extended or adjusted under 35 U.S.C. 154(b) by 1597 days.

(21) Appl. No.: 11/913,023

(22) PCT Filed: Apr. 25, 2006

(86) PCT No.: PCT/IB2006/051292
§ 371 (c)(1), (2), (4) Date: Oct. 29, 2007

(87) PCT Pub. No.: WO2006/117722
PCT Pub. Date: Nov. 9, 2006

(65) Prior Publication Data
US 2008/0204554 A1 Aug. 28, 2008

(30) Foreign Application Priority Data
Apr. 29, 2005 (EP) .................................... 05103570

(51) Int. Cl.
*H04N 7/18* (2006.01)
*H04N 9/47* (2006.01)
*G06F 7/00* (2006.01)
*G06F 17/30* (2006.01)

(52) U.S. Cl.
USPC ............ 348/143; 348/152; 348/159; 707/791

(58) Field of Classification Search .... 340/568.1–572.9; 348/143, 152, 159; 707/791
See application file for complete search history.

(56) References Cited

U.S. PATENT DOCUMENTS

| | | | | |
|---|---|---|---|---|
| 4,471,345 | A * | 9/1984 | Barrett, Jr. | 340/572.1 |
| 5,083,111 | A * | 1/1992 | Drucker et al. | 340/572.1 |
| 5,151,684 | A * | 9/1992 | Johnsen | 340/568.1 |
| 5,461,390 | A * | 10/1995 | Hoshen | 342/419 |
| 5,745,036 | A * | 4/1998 | Clare | 340/572.1 |
| 5,942,987 | A * | 8/1999 | Heinrich et al. | 340/10.42 |
| 6,025,780 | A * | 2/2000 | Bowers et al. | 340/572.3 |
| 6,552,663 | B2 * | 4/2003 | Swartzel et al. | 340/572.1 |
| 7,274,294 | B2 * | 9/2007 | Heinze et al. | 340/572.1 |
| 7,295,114 | B1 * | 11/2007 | Drzaic et al. | 340/572.1 |
| 7,463,142 | B2 * | 12/2008 | Lindsay | 340/539.12 |

(Continued)

FOREIGN PATENT DOCUMENTS

EP 0487982 A2 6/1992

*Primary Examiner* — Thu Nguyen
*Assistant Examiner* — Angela Widhalm

(57) ABSTRACT

An electronic article surveillance system (1) comprises a read/write station (2; 217, 218, 220-224) that is designed to communicate an electronic article surveillance status test-request command comprising zone information that indicates an electronic article surveillance zone for which an electronic article surveillance status that is assigned to said zone is to be tested, and further comprises a data carrier (3; 31-35) having a circuit (11) that is designed to store status data (SD) for indicating whether an electronic article surveillance status is active and to store zone data (ZD) for specifying at least one electronic article surveillance zone to which the electronic article status is assigned, the data carrier (3; 31-35) being further designed to test whether said stored status is active for the electronic article surveillance zone to which it is assigned in the case that this zone is indicated by the zone information provided by the read/write station (2; 217, 218, 220-224).

20 Claims, 3 Drawing Sheets

U.S. PATENT DOCUMENTS

| | | | | |
|---|---|---|---|---|
| 7,969,306 | B2 * | 6/2011 | Ebert et al. | 340/572.1 |
| 2001/0000019 | A1 * | 3/2001 | Bowers et al. | 340/572.1 |
| 2001/0045893 | A1 * | 11/2001 | Swartzel et al. | 340/572.1 |
| 2002/0116509 | A1 * | 8/2002 | DeLaHuerga | 709/229 |
| 2003/0197612 | A1 * | 10/2003 | Tanaka et al. | 340/572.1 |
| 2004/0000997 | A1 | 1/2004 | Stevens et al. | |
| 2004/0150525 | A1 | 8/2004 | Wilson et al. | |
| 2004/0233042 | A1 | 11/2004 | Piccoli et al. | |
| 2005/0190060 | A1 * | 9/2005 | Clancy et al. | 340/572.9 |
| 2006/0176177 | A1 * | 8/2006 | Heinze et al. | 340/572.1 |
| 2007/0222595 | A1 * | 9/2007 | Motteram et al. | 340/572.1 |
| 2008/0278324 | A1 * | 11/2008 | Uchimura et al. | 340/572.1 |

* cited by examiner

ELECTRONIC ARTICLE SURVEILLANCE SYSTEM

FIELD OF THE INVENTION

The invention relates to a circuit for a data carrier, which data carrier comprises data carrier transmission means that are designed for a contact-less communication with a read/write station.

The invention further relates to a data carrier comprising data carrier transmission means, which data carrier transmission means are designed for a contact-less communication with a read/write station, and a circuit according to the preceding paragraph.

The invention further relates to a read/write station that is designed for a contact-less communication with a data carrier.

The invention further relates to an electronic article surveillance system comprising at least one read/write station according to the preceding paragraph and at least one data carrier according to the second paragraph.

The invention further relates to a method of testing whether an electronic article surveillance status that is represented by means of data stored in a data carrier is active.

The invention further relates to a method of processing an electronic article surveillance status test-request command in a data carrier.

The invention further relates to a method of operating an electronic article surveillance system comprising the steps of the method according to the fifth paragraph and the steps of the method according to the sixth paragraph.

BACKGROUND OF THE INVENTION

The patent document EP 0 487 982 A2 discloses an electronic article surveillance system according to the fourth paragraph that is operated according to a method of operating an electronic article surveillance system according to the seventh paragraph by utilizing a read/write station according to the third paragraph and a number of data carriers according to the second paragraph, each data carrier comprises a circuit according to the first paragraph. In the known system the read/write station releases a message signal that represents a electronic article surveillance status test-request command and a data carrier comprising status data, which status data indicate whether an electronic article surveillance status is active or not active, receives the message signal and responds in case that the status data represent that the electronic article surveillance status is active for said data carrier. In order to define a first electronic article surveillance zone and a second electronic article surveillance zone that is different from the first zone said patent document discloses to provide a jamming apparatus for generating a jamming signal that allows to jam up the message signal of the read/write station within the second electronic article surveillance zone. By providing these measures data carrier being located in the second electronic article surveillance zone will not respond to the message signal released by the read/write station.

The prior art system shows the problem that such overlapping or superposition of signals does allow to define relatively large electronic article surveillance zones in which data carrier that are located either in the first zone or in the second zone do show a different behavior in the meaning of responding or not responding to a message signal. On the other hand such a system does not allow to associate a particular data carrier with the first zone or with the second zone, because the different electronic article surveillance zones are solely defined by the signals produced either by the read/write station or by the jamming apparatus and the superposition of these field, which defines one zone being different from another zone that does not show a superposition of said signals.

OBJECT AND SUMMARY OF THE INVENTION

It is an object of the invention to provide a circuit for a data carrier of the type mentioned in the first paragraph and a data carrier of the type mentioned in the second paragraph and a read/write station of the type mentioned in the third paragraph and an electronic article surveillance system of the type mentioned in the fourth paragraph and a method of testing whether an electronic article surveillance status that is represented by data stored by means of a data carrier is active of the type defined in the fifth paragraph and a method of processing an electronic article surveillance status test-request command in a data carrier of the type mentioned in the sixth paragraph and a method of operating an electronic surveillance system of the type mentioned in the seventh paragraph, which obviate the drawbacks described above.

To achieve the object described above, characteristic features according to the invention are provided with a circuit for a data carrier according to the invention, so that a circuit for a data carrier according to the invention can be characterized as follows:

Circuit for a data carrier, which data carrier comprises data carrier transmission means that are designed for a contact-less communication with a read/write station, which circuit comprises interface means that are designed to cooperate with the data carrier transmission means, and which circuit comprises storage means that are provided a) to store status data for indicating whether an electronic article surveillance status is active or not active and aa) to store zone data for specifying at least one electronic article surveillance zone to which the electronic article surveillance status is assigned, and which circuit comprises test means that are designed b) to receive from the interface means reception data, which reception data are generate-able during a contact-less communication with the read/write station and which reception data represent an electronic article surveillance status test-request command comprising zone information, which zone information indicates an electronic article surveillance zone for which the electronic article surveillance status that is assigned to said indicated electronic article surveillance zone is to be tested, and bb) to test whether the status data indicate that the electronic article surveillance status is active for the indicated electronic article surveillance zone, and, bbb) in the case that the electronic article surveillance status is active for the indicated electronic article surveillance zone, to generate test result representation data that represent that the electronic article surveillance status is active for the indicated electronic article surveillance zone.

To achieve the object described above, characteristic features according to the invention are provided with a data carrier according to the invention, so that a data carrier according to the invention comprises a circuit for a data carrier according to the invention.

To achieve the object described above, characteristic features according to the invention are provided with a read/write station according to the invention, so that a read/write station according to the invention can be characterized as follows:

Read/write station, comprising station transmission means that are designed for a contact-less communication with a data carrier, and transmission data generating means that are designed to generate and to release transmission data, which transmission data represent an electronic article surveillance status test-request command comprising zone information, which zone information indicates an electronic article surveillance zone for which an electronic article surveillance status that is assigned to said indicated electronic article surveillance zone is to be tested, and which transmission data are intended to be communicated by the aid of the station transmission means in a contact-less communication to a data carrier.

To achieve the object described above, characteristic features according to the invention are provided with an electronic article surveillance system according to the invention, so that an electronic article surveillance system according to the invention comprises at least one read/write station according to the invention and at least on data carrier according to the invention.

To achieve the object described above, characteristic features according to the invention are provided with a method of testing according to the invention, so that a method of testing according to the invention can be characterized as follows:

Method of testing whether an electronic article surveillance status that is represented by means of status data stored in a data carrier is active, which method comprises the following steps, namely:

generating transmission data, which transmission data represent an electronic article surveillance status test-request command comprising zone information, which zone information indicates an electronic article surveillance zone for which an electronic article surveillance status that is assigned to said indicated electronic article surveillance zone is to be tested, and releasing said transmission data in a contact-less manner.

To achieve the object described above, characteristic features according to the invention are provided with a method of processing according to the invention, so that a method of processing according to the invention can be characterized as follows:

A method of processing an electronic article surveillance status test-request command in a data carrier, which data carrier stores status data for indicating whether an electronic article surveillance status is active or not active and zone data for specifying at least one electronic article surveillance zone to which the electronic article surveillance status is assigned, which method comprises the following steps, namely receiving during a contact-less communication with a read/write station reception data, which reception data represent an electronic article surveillance status test-request command comprising zone information, which zone information indicates an electronic article surveillance zone for which the electronic article surveillance status that is assigned to said indicated electronic article surveillance zone is to be tested, and testing whether the status data indicate that the electronic article surveillance status is active for the indicated electronic article surveillance zone, and, in the case that the electronic article surveillance status is active for the indicated electronic article surveillance zone, generating test result representation data that represent that the electronic article surveillance status is active for the indicated electronic article surveillance zone.

To achieve the object described above, characteristic features according to the invention are provided with a method of operating an electronic article surveillance system according to the invention, so that a method of operating an electronic article surveillance system according to the invention comprises a method of testing according to the invention and a method of processing according to the invention.

The provision of the characteristic features according to the invention creates the advantage that a data carrier can be associated with at least one particular electronic article surveillance zone and that the electronic article surveillance status for this particular electronic article surveillance zone can be explicitly tested. This allows all data carrier that do not have an electronic article surveillance status associated with the indicated electronic article surveillance zone to be excluded from handling the electronic article surveillance status test-request command. Consequently a multi-shop application or shop in shop application is enabled, in which application an article is tagged with a data carrier and the electronic article surveillance status can be set (status=active) or reset (status=not active/inactive) only for selected areas (electronic article surveillance zones) for which an electronic article surveillance status test-request command shall have an effect.

Other solutions according to the invention provide the advantage that the result of the test can be communicated any time desired, which means that the response data can be communicated immediately after the test is performed, which means during the present communication with the read/write station that has released the test-request command, or at any time later, e.g. also during a consecutive request from another read/write station that is located at a different position with respect to a first read/write station that has caused the test result to be generated.

Other solutions according to the invention provide the advantage that the zone information is communicated between a read/write station and a data carrier in a protected manner, e.g. encrypted by the read/write station and decrypted by the data carrier. Hence fraudulent use or any manipulation of the zone information by unauthorized users can be avoided.

Other solutions according to the invention provide the advantage that a hierarchical structure of electronic article surveillance zones can be established and appropriately handled.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting example, with reference to the embodiments shown in the drawings.

DESCRIPTION OF EMBODIMENTS

Figure 1:
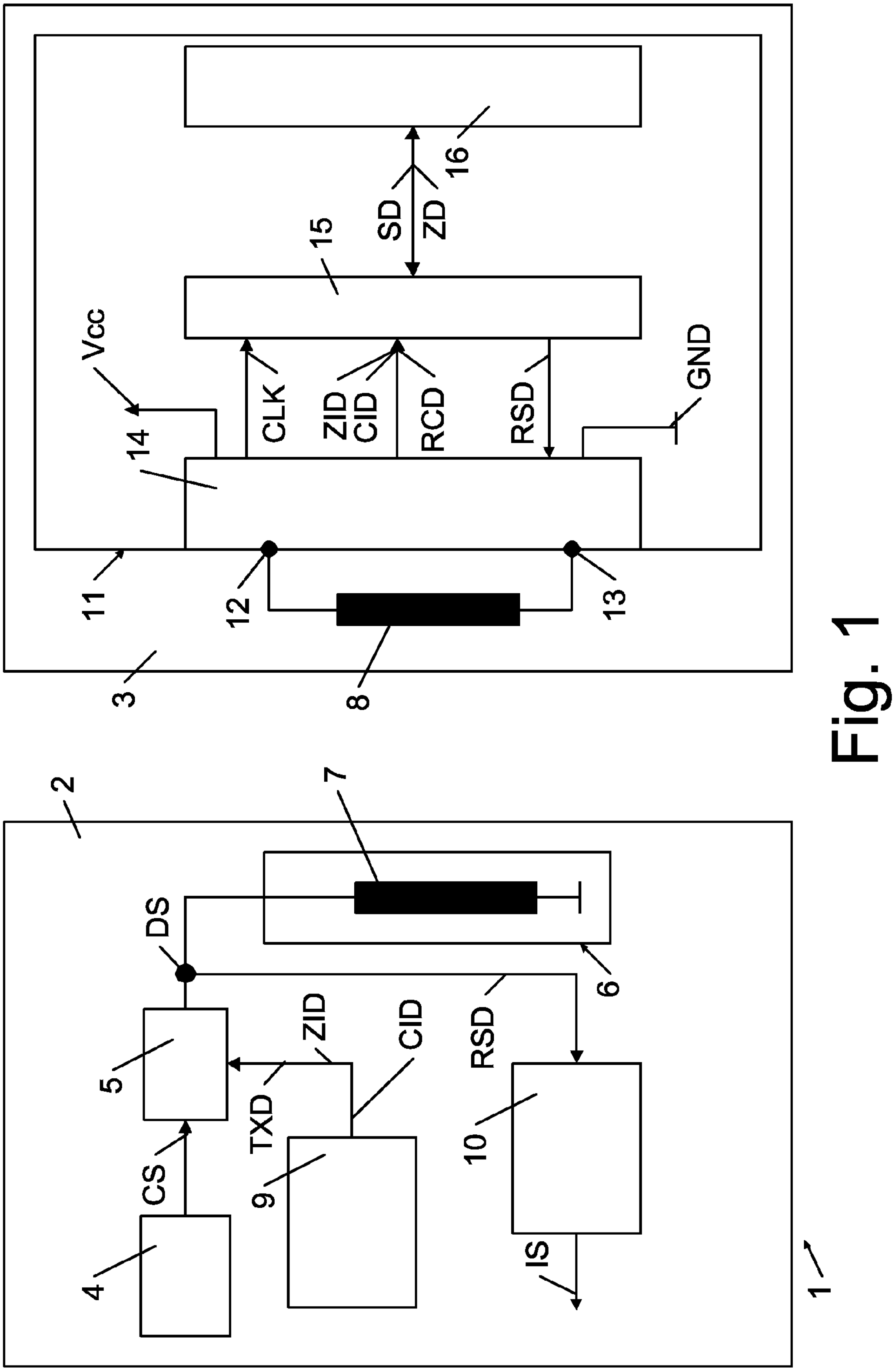
FIG. 1 shows in form of a block diagram an electronic article surveillance system according to a first embodiment of the invention.

FIG. 1 shows an electronic article surveillance system that will be called system 1 in the following description, which system 1 comprises a read/write station that will be called station 2 in the following description and which system 1 comprises a data carrier 3. The system 1 is designed for electronic article surveillance, which will be elaborated in details herein below.

The station 2 comprises an oscillator stage 4 that is designed to generate a carrier signal CS for the purpose of contact-less communication with the data carrier 3. The station 2 further comprises modulation means 5 that are designed to receive the carrier signal CS and transmission data TXD and to modulate the carrier signal CS dependent on the transmission data TXD. The station 2 further comprises station transmission means 6 of which only a communication coil arrangement 7 is schematically shown in FIG. 1. The man skilled in the art will immediately understand that a tuned resonance circuit and a matching circuit may be comprised in the station transmission means 6 if necessary. By the aid of the station transmission means 6 an inductive coupling with corresponding data carrier transmission means 8, which are realized as a data carrier coil that is schematically shown in FIG. 1, can be established for the purpose of contact-less communication. In this connection it can be mentioned that in another embodiment also a capacitive coupling can be realized for the purpose of contact-less communication between the station 2 and the data carrier 3. However also antennas may be comprised in the station transmission means 6, e.g. mono-pole or multi-pole antennas can be considered.

The station 2 further comprises transmission data generating means 9 that are designed to generate the transmission data TXD, which transmission data TXD represent an electronic article surveillance status test-request command, in the following called test-request command. The test-request command comprises command identification data CID, which command identification data CID are compliant with prior art in order to guarantee backward compatibility of the system 1 with prior art electronic article surveillance systems. The command identification data CID are utilized at the side of the data carrier 3 for identifying the test-request command. It can be mentioned that in case of no required backward compatibility the command identification data CID may be different from prior art. The test-request command further comprises zone information data ZID for representing zone information. The zone information indicates an electronic article surveillance zone, for which electronic article surveillance zone an electronic article surveillance status that is assigned to said indicated electronic article surveillance zone is to be tested. The transmission data generating means 9 are designed to release the transmission data TXD to the modulation means 5.

Figure 2:
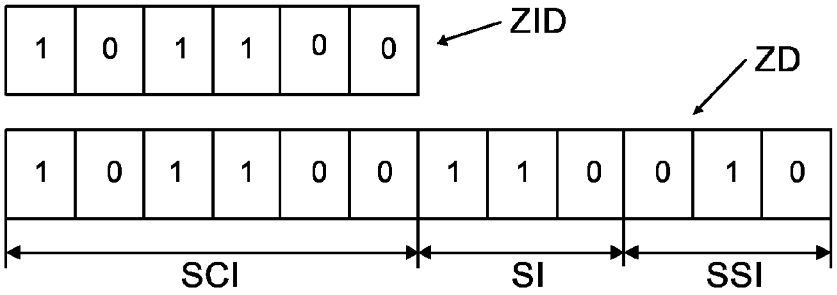
FIG. 2 shows schematically a first example of zone information data and zone data utilized by the system according to FIG. 1.
Figure 3:
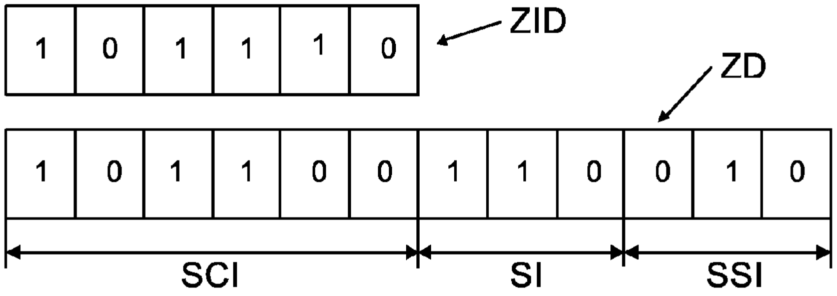
FIG. 3 shows in the same manner as FIG. 2 a second example of zone information and zone data.

FIG. 2 shows a first example of the zone information data ZID and FIG. 3 shows a second example of the zone information data ZID. Both zone information data show a bit string of 6 bits having a different bit value at bit position five (5).

The station 2 shown in FIG. 1 further comprises evaluation means 10, which are designed to receive a data signal DS, which data signal DS can be taped at the station transmission means 6. The evaluation means 10 are further designed to demodulate and to decode the data signal DS and to evaluate whether a data carrier 3 has responded to the test-request command by means of response data RSD that are represented by the taped and processed data signal DS. The evaluation means 10 are further designed to release an indication signal IS in the case that such response data RSD have been detected. Also in the present case the response data are compliant with prior art definitions due to the backward compatibility requirement. However in cases in which the backward compatibility requirement is not desired also generic definitions may apply for the response data RSD. Also generic signal shapes or signal parameters of the taped data signal can be considered to be evaluated as a response to the test-request command.

In the present case the station 2 and the data carrier 3 are designed to produce and to process signals that are compliant with the international standard ISO/IEC 14443. According to this standard amplitude shift keying (ASK) is applied in order to produce a modulated carrier signal. But also other modulation schemes like schemes for modulating phase and frequency of the carrier signal CS may be considered in further embodiments. In a further embodiment the station 2 and the data carrier 3 may be designed to produce and to process signals according to the international standard ISO/IEC 18000 or according to the international standard ISO/IEC 18092 (NFC) or ISO 15695. But also a realization for producing and processing signals according to proprietary specifications or according to future standards can be considered.

The data carrier 3 shown in FIG. 1 comprises in addition to the data carrier transmission means 8 a circuit 11, which in the present case is an integrated circuit produced in CMOS technology. The circuit 11 comprises two connection pads 12 and 13 to which the data carrier transmission means 8 are connected. The circuit 11 further comprises interface means 14 that are designed to establish a tuned resonant circuit (not shown) together with the data carrier transmission means 8 and to utilize a signal S that is produced during the inductive coupling with the station transmission means 6 for producing a supply voltage VCC that is used to supply active components of the circuit 11 with electric power. The signal S is further utilized for producing a clock signal CLK that is used to clock parts of the circuit 11 that require the clock signal CLK. Although for the sake of sense and simplicity only one such part is shown in FIG. 1 in the form of a microprocessor 15 that require clocking and powering. However, the man skilled in the art will understand that also other parts of the circuit 11 may require the clock signal CLK and the supply voltage VCC. The interface means 14 are further designed to demodulate and decode the signal S and to provide reception data RCD to the microprocessor 15. The interface means 14 are further designed to receive response data RSD from the microprocessor 15 and to modulate the signal S by means of a load modulation, which can be detected by the evaluation means 10 of the station 2.

The microprocessor 15 executes software in order to provide processing functions like testing an electronic article surveillance status as will be explained during the following description. The software is stored in a non-volatile memory, which is not shown in FIG. 1. In another embodiment also a logic circuit may be provided that does require to be clocked or does not require to be clocked. As an example of such a logic circuit a so called application specific integrated circuit, in short ASCI, can be mentioned, but does not limit the scope to be considered. However, also a micro-controller may be considered for substituting the microprocessor 15, which micro-controller not only comprises processing functionality but also comprises all required storage means within its structure.

The data carrier 3 further comprises storage means 16 that are coupled with the microprocessor 15 for the purpose of receiving data to be stored from the microprocessor 15 and for the purpose of providing data to the microprocessor 15. In the present case the storage means 16 are realized as an electrically erasable program only memory, known as EEPROM, but also other types of erasable non-volatile memories may be considered.

The storage means 16 are provided to store status data SD that specify an electronic article surveillance status. The status can either be active, which active status is represented by a status bit having the logical value TRUE or not active, which means inactive and which is represented by the status bit having the logical value FALSE. In practice the status bit representing TRUE indicates that a product or article, to which the data carrier is attached, has not yet been purchased and is therefore not allowed to leave an article surveillance zone. Such an article surveillance zone is typically formed by physical boundaries that cannot be overcome by a customer and a gate that at least comprises the station transmission means 6 in order to allow a contact-less interrogation of the data carrier 3 or a communication with the data carrier 3.

The storage means 16 are further provided to store zone data ZD that specify at least one electronic article surveillance zone to which the electronic article surveillance status is assigned. An example of zone data ZD is shown in FIGS. 2 and 3. The shown zone data ZD comprise 12 bits and allow to specify three electronic article surveillance zone categories, namely a first category that are shopping centers and a second category that are shops and a third category that are shops in a shop also called sub-shops. The three (3) highest significant bits, which in the following description are called sub-shop-identifier SSI, are reserved for indicating different article surveillance zones corresponding to so called shop-in-shop article surveillance zones like a “HiFi-device” zone, “home appliances” zone, “music record” zone or the like. The next three (3) lower significant bits, which in the following description will be called shop-identifier SI, are reserved for indicating different article surveillance zones corresponding to so called shop article surveillance zones like “Interspar”, “Billa”, “Mediamarkt”, “Anker” or the like. The remaining six (6) least significant bits, which in the following description will be called shopping center identifier SCI, are reserved for indicating different article surveillance zones corresponding to different shopping centers like “Shopping Center South”, “Shopping Center North” or the like. Consequently the zone data are designed to specify electronic article surveillance zones indicated by the sub-shop identifier SSI to be a sub-zone of the electronic article surveillance zone indicated by the shop-identifier SI. Similar to the relation between sub-shop-identifier SSI and shop-identifier SI the electronic article surveillance zone indicated by to the shop-identifier SI is a sub-zone of the electronic article surveillance zone indicated by the shopping center identifier SCI. At this point it can be mentioned that the length of the bit strings of the individual identifiers SSI and SI and SCI can be as desired and appropriate for the respective supported business model, e.g. the required number of zones or sub-zones. Also the number of identifiers can vary dependent on the required number of categories. Also the order of the stored identifier SSI, SCI and SI within the zone data ZD may be different according to implementation or application requirements.

The data carrier 3 further comprises test means that are realized by the microprocessor 15 while executing said software like indicated in one of the preceding paragraphs. The test means are designed to receive from the interface means 14 reception data RCD and to detect a test-request command represented by the reception data RCD. The test means are designed to test first of all whether the test-request command comprises any zone information and to abort any check for the zone data in case that no zone information has been provided because of backward compatibility. In this case only the electronic article surveillance status represented by the status data is tested and in case that the test reveals that it is active response data RSD are generated and released to the interface means 14 for indicating the active status without considering any zone dependency.

In case that the zone information data ZID are provided the test means are designed to extract the six (6) bits of the zone information data ZID corresponding to the stored shopping-center-identifier SCI and test whether they are equal with the stored shopping-center-identifier SCI. If they are equal to each other the zone information provided by means of the test-request command indicates an electronic article surveillance zone (shopping center) for which the electronic article surveillance status that is assigned to said indicated electronic article surveillance zone is to be tested. Otherwise, the test means are designed not to perform any further test on the electric article surveillance status because the zone information provided by the test-request command does not indicate an electronic article surveillance zone (shopping center) to which an electronic article surveillance zone status is assigned by means of the stored zone data ZD stored in the data carrier 3.

In case that additional three (3) bits corresponding to the shop-identifier SI are provided by means of the zone information data ZID the test means are designed to extract the three (3) additional bits and to test whether they are equal with the stored shop-identifier SI. If they are equal to each other the zone information provided by means of the test-request command indicates an electronic article surveillance zone (a shop in a shopping center) for which the electronic article surveillance status that is assigned to said indicated electronic article surveillance zone is to be tested. Otherwise the test means are designed to consider only the most recent higher-level zone category, which is the indicated shopping center, for which the electronic article surveillance status is to be tested.

In case that further additional three (3) bits corresponding to the sub-shop identifier SSI are provided by means of the zone information data ZID the test means are designed to extract the three (3) additional bits and to test whether they are equal with the stored sup-shop identifier SI. If they are equal to each other the zone information provided by means of the test-request command indicates an electronic article surveillance zone (a sub-shop in a shop in a shopping center) for which the electronic article surveillance status that is assigned to said indicated electronic article surveillance zone is to be tested. Otherwise the test means are designed only to consider the most recent higher-level zone category, which is the indicated shop inside the indicated shopping center, for which the electronic article surveillance status is to be tested.

After having established that the electronic article surveillance zone (or more precisely the hierarchy of zones) indicated by the test-request command is represented by the zone data ZD stored by means of the storage means 16, the test means are designed to test whether the status data SD indicate that the electronic article surveillance status is active for the electronic article surveillance zone indicated by means of the test-request command. The test means are further designed to generate test result representation data (not shown in FIG. 1) that represent that the electronic article surveillance status is active for the indicated zone. In the present case it is provided that the logical value of the bit represented by the status data is simply copied into on of the registers of the microprocessor 15. In another embodiment it can be provided that the test result representation data are stored by means of the storage means 16. This option is in particular of interest for the case in which the result representation data need to be communicated to the station 2 at a later moment in time. In the present case the test means are designed to—immediately after having generated the result representation data after having received and processed the test-request command—release to the interface means response data RSD corresponding to the result representation data. The response data RSD are intended to be communicated to the station 2 during a contact-less communication. As the response data RSD correspond to the result representation data they also represent that the electronic article surveillance status is active for the indicated electronic article surveillance zone.

Figure 4:
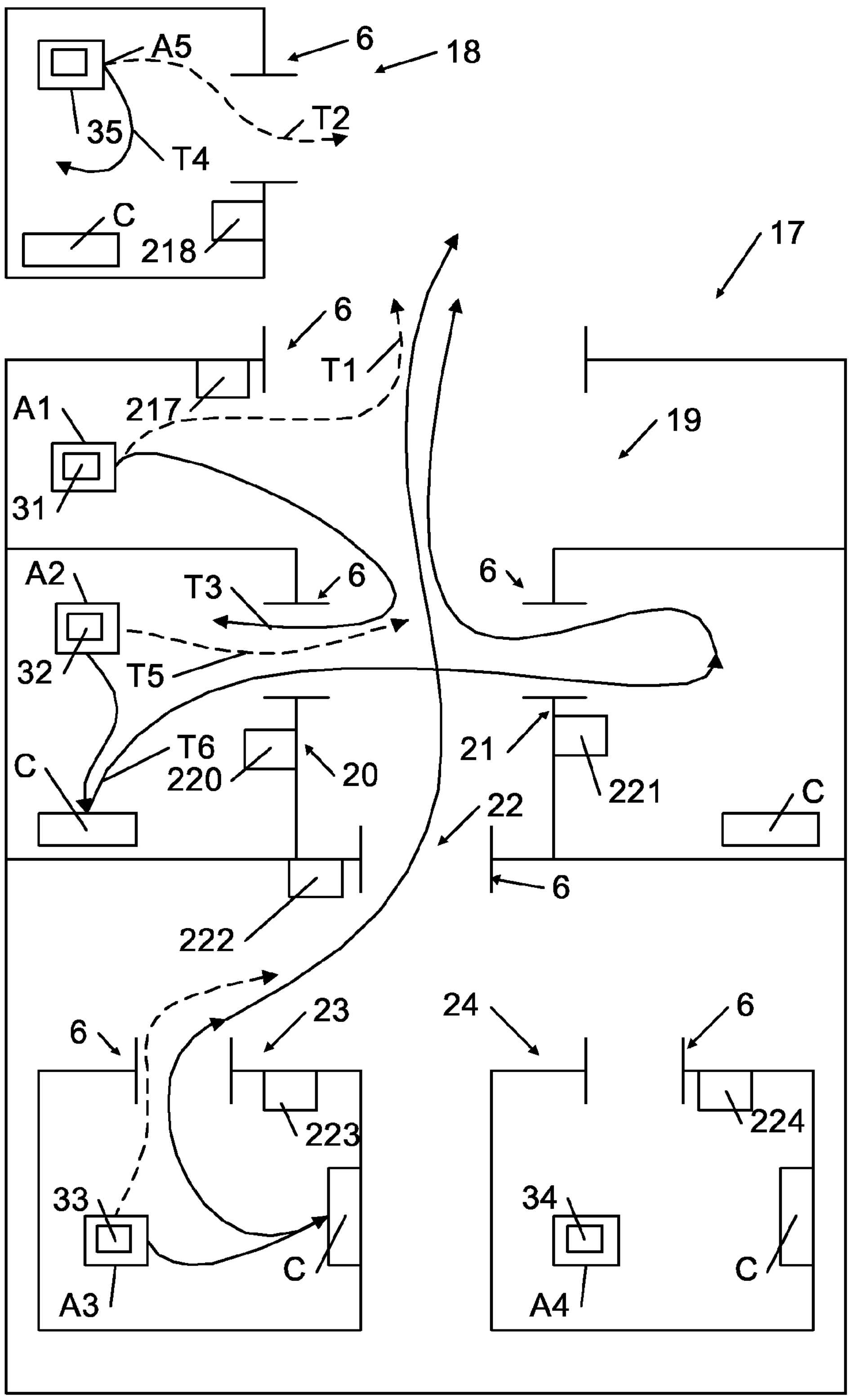
FIG. 4 shows in the same manner as FIG. 1 a system according a second embodiment of the invention.

In the following the operation of the system 1 and its components is described by the aid of FIGS. 4 and 5. FIG. 4 shows a first shopping center 17 and a second shopping center 18. The first shopping center 17 comprises a hall 19 and a first shop 20 and a second shop 21 and a third shop 22. The third shop comprises a first sub-shop 23 and a second sub-shop 24. Each of the aforementioned entities 17, 18, 20, 21, 22, 23, and 24 forms an electronic article surveillance zone. In order to avoid unauthorized removal of articles A1 . . . A5 the first shopping center 17 as well as each shop 20, 21 and 22 and as well as each sub-shops 23 and 24 and the second shopping center 18 is equipped with a station 2 according to FIG. 1 at the respective door/gate, wherein of each station 2 only the station transmission means 6, which are positioned on either side of the door/gate and which are connected to the respective station 2 that is indicated by means of one of the reference signs 217, 218, 220, 221, 222, 223 and 224 is shown in FIG. 4. Each article A1 . . . A5 is tagged with a data carrier 3 according to FIG. 1, which data carriers 3 are indicated by means of the reference signs 31, 32, 33, 34, and 35. For each data carrier the content of the zone data ZD and the status data SD are shown in FIG. 5.

Figure 5:
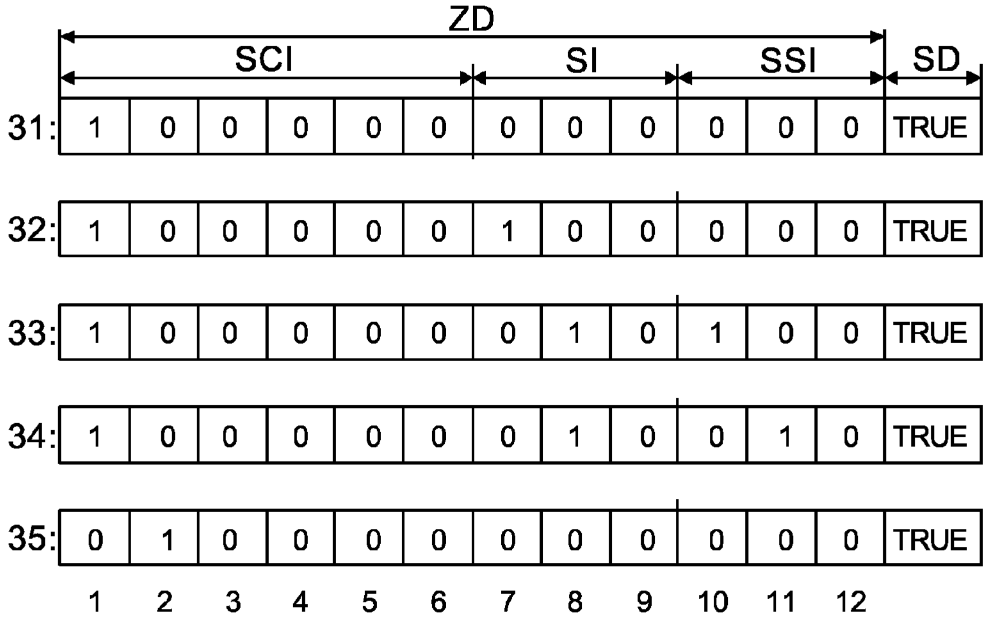
FIG. 5 shows in the same manner as FIG. 2 zone data and status data utilized by the system according to FIG. 4.

According to FIG. 5 the zone data ZD of the data carrier 31 . . . 34 show identical shopping-center-identifier SCI identifying the first shopping center 17 and the zone data of the data carrier 35 shows a shopping-center-identifier SCI identifying the second shopping center 18. The shop-identifier SI and the sub-shop-identifier SSI for the data carrier 31 and 35 are set to the binary value "zero" as for the tagged articles A1 and A5 article surveillance has to performed only on the hierarchical level of the shopping center. In contrast to the articles A1 and A5 the article A2 on the one hand and the Articles A3 and A4 on the other hand show distinguishable shop-identifier S1. The articles A2 . . . A3 require article surveillance on the shop level. Article A2 does not require article surveillance on the sub-shop level as no sub-shop is defined for the first shop 20. Therefore the bits of the sub-shop-identifier SSI for the data carrier 32 is set to the binary value "zero". Due to the fact that the articles A3 and A4 require article surveillance on the sub-shop level the data carrier 33 and 34 comprise distinguishable sub-shop-identifier SSI. According to the definitions of article surveillance zones, for which a test of the article surveillance status of a data carrier 3 has to be done, also the zone information data ZID stored in the individual stations 217, 218, 220, 221, 222, 223 and 224 has to be appropriately set. Therefore the zone information data ZID of the station 217, 220, 221, 222, 223 and 224 comprises the shopping-center-identifier SIC of the data carrier 31, as this shopping-center-identifier SIC is identical with the those of the data carriers 32, 33 and 34. The zone information ZID of the station 218 comprises the shopping-center-identifier SCI of the data carrier 35. For the zone information data ZID of the data carrier 31 and 35 no further data are required. The zone information data ZID of the station 220 comprises in addition to the aforementioned shopping-center-identifier SCI also the shop-identifier SI of the data carrier 32. No sub-shop-identifier SSI is comprises in the zone information data ZID for the station 220. The zone information data ZID of the station 222, 223 and 224 comprises in addition to the aforementioned shopping-center-identifier SIC the shop-identifier SI of the data carrier 33, as this shop-identifier SI is identical with the shop identifier SI of the data carrier 34. For the zone information data ZID of station 222 no additional sub-shop-identifier are comprised. In addition to the aforementioned shopping-center-identifier SSI and the shop-identifier SI the zone information data ZID of the station 223 and the station 224 also comprises individual sub-shop-identifier SSI, which is in the case of the station 223 the sub-shop-identifier SSI of the data carrier 33 and in the case of the station 224 the sub-shop-identifier SSI of the data carrier 34.

Loaded with these individual zone information data ZID all stations 217, 218, 220, 221, 222, 223 and 224 permanently perform a method of testing whether an electronic article surveillance status that is represented by means of the status data SD stored in a data carrier 31 . . . 35 is active. The method of testing comprises generating the individual transmission data TXD by means of each station 217, 218, 220, 221, 222, 223 and 224, which individual transmission data TXD represent the test-request command comprising the individual zone information data ZID, and releasing said individual transmission data TXD in a contact-less manner form the station 217, 218, 220, 221, 222, 223 and 224. In addition the method further comprises that each station 217, 218, 220, 221, 222, 223 and 224 evaluates whether a data carrier 3 has responded to the contact-less released test-request command. This is performed by means of demodulating and decoding the data signal DS taped at the station transmission means 6 and checking whether the data received are the expected response data TXD.

For the following explanation of a method of operating the electronic article surveillance system according to FIG. 4 it is assumed that the article A1 and the article A5 is a trolley that is under no circumstance allowed to leave the respective shopping center 17 and 18. For both articles A1 and A5 so-called illegal ways along tracks T1 and T2 are shown by means of dashed lines passing the respective door/gate of the shop center 17 or 18, which door/gate is monitored by means of the station 217 in case of the first shopping center 17 and by means of the station 218 in case of the second shopping center 18. Examples of so-called legal ways are indicated along tracks T3 and T4, which are characterized as those tracks, for which the article A1 and A2 stays within the boundaries of the respective shopping center 17 or 18. As soon as an article, e.g. A1, is brought into an area of the door of the first shopping center 17 the integrated circuit 11 of the data carrier 31 is powered and clocked by the aid of the carrier signal CS released by means if the station transmission means 6 of the station 217. The data carrier 31 is consequently enabled for performing a method of processing a test-request command received from the station 217. According to the method of processing the data carrier 31 receives during a contact-less communication with the station 217 reception data RCD, which reception data RCD represent the test-request command. The test-request command released from the station 217 comprises as zone information the shopping-center-identifier SCI of the data carrier 31 as shown in FIG. 5. According to the method of processing the data carrier 31 tests whether the received shopping-center-identifier is equal to the shopping-center-information SCI stored as part of the zone data ZD in its storage means 16. As they are equal to each other and as no further zone information (e.g. a sub-zone of the first shopping center 17) is provided, the data carrier 31 test whether the status data SD stored by means of the storage means 16 indicate that the electronic article surveillance status is active for the surveillance zone that is indicated by the received shopping-center-identifier SCI. In the present case the status date SD indicate that the status is active and the data carrier 31 generates the test result representation data representing this active status and immediately generates on the basis of the test result representation data the response data RDS that correspond to the test result representation data. In the present case the test result representation data are equal to the response data RSD and comprise a predefined bit sequence. However, there might also be another relationship between the test result representation data and the response data RSD.

On the side of the station 217 the response data are detected by the aid of the evaluation means 10 and the indication signal IS is produced and released. The indication signal IS triggers an alarm device that is not shown in the figures.

In case that the data carrier 31 is moved along its legal track into the e.g. first shop 20 by passing door/gate of the first shop 20 the data carrier 31 receives the zone data ZD of the data carrier 32 from the station 220, which zone data ZD are shown in FIG. 5. These data comprise in addition to the shopping-center-identifier SCI that identifies the first shopping center 17 also the shop-identifier SI that identifies the first shop 20. As the data carrier 31 detects that not only the shopping-center-identifier SCI but also the shop-identifier SI is provided it simply skips any further test and does not respond to the received test-request command.

In the following it is considered that the article 32 is a trouser. The trouser first of all needs to be checked out by being purchased at a check out desk C. The check out desk is designed to communicate in a contact-less manner with the data carrier and to set the electronic article surveillance status to inactive. The processing of the received test-request command is quite different for the data carrier 32 that tags the trouser if it is moved along its illegal track T5 and brought into area of the door/gate of the first shop 20. As the data carrier 32 comprises in its zone data ZD the shopping-center-identifier SCI and the shop-identifier SI that are provided by the station 220 the data carrier testes whether status data represent an active status. As this is the case the generated and communicated response data RSD trigger an alarm on the side of the station 220. In the case that the article was purchased and the status was set to inactive the article A2 can be moved out of the first shop without triggering any alarm. In the case that the purchased article A2 is moved into the second shop 21 also no alarm will be triggered as the data carrier 32 detects that the shop-identifier SI provided by the test-request command released by the station 221 is different from the shop-identifier SI stored by means of the zone data ZD in the storage means 16 of the data carrier 32. Consequently no further check on the status data SD is performed by the data carrier 32.

Also for the sub-shop 23 the same method as described above is performed. It is tested whether the zone information provided by the test-request command released by the station 223 does match with the zone data ZD stored in the storage means 16 of the data carrier 33 as soon as the article A3 is moved into the area of the door or gate of the sub-shop 23 (dashed track=illegal/solid track via check out desk C=legal). The data carrier 33 detects that not only shopping-center-identifier SCI of the first shopping center 17 but also the shop-identifier SI of the third shop 22 and in addition also the sub-shop-identifier SSI is provided and checks if these received identifiers SCI and SI and SSI are equal to the stored zone data ZD. Dependent thereon the electronic article surveillance status is tested or not tested. The same is true for the data carrier 34 tagging the article A4 (no tracks shown in FIG. 4). As soon as the article A3 is made to pass the gate of the sub-shop 23 without being purchased in advance at the check out desk C an alarm will be triggered. After having legally checked out the article A3 the status data SD of the data carrier 33 are set to represent an inactive electronic surveillance status and the article A3 can freely be moved within the third shop 22 or within the whole first shopping center 17 or even into the second shopping center 18 or out of any of the mentioned surveillance zones 17, 18, 20, 21, 22, 23 or 24. The same is basically true for the article A4 and its data carrier 34.

In order to make the system 2 secure it can be mentioned that the access to the status data SD for reading the status data SD or for changing the status date SD can be protected by means of a password or by means of an encryption and decryption mechanism or by means of a digital signature. The same consideration may be applied for the same type of accesses to the zone data ZD. It may also be considered to have the zone data stored on distributed storage addresses of the storage means 16.

According to another embodiment it may be considered that the status data SD are represented by the zone data ZD. In order to have this realized it would be necessary to define one symbol that defines an inactive electronic article surveillance status. Such a symbol may be the bit string "000000" for the shopping-center-identifier SCI and "000" for the shop-identifier SI and "000" for the sub-shop-identifier "000". At the same time it shall be guaranteed that the zone information provided by the station 2 does not comprise said symbol. A data carrier tagging an article will typically comprise zone data ZD representing the appropriate electronic article surveillance zone from which it shall not be removed without being checked out. As soon as an article is checked out at check out desk C the zone data will be modified in order to represent said symbol. In case that the data carrier 2 is not appropriately checked out and the zone information received from the station 2 indicated the electronic article surveillance zone specified by the zone data ZD the data carrier will immediately produce the test result representation data representing the active status. The symbol may be called "inactive symbol" as it allows indicating that the electronic article surveillance zone to which it is applied by means being stored as part of the zone data ZD has an inactive electronic article surveillance status According to another embodiment it may be required due to business reasons or logistics to have electronic article surveillance performed e.g. only the highest level, which is the shopping center level, and on the lowest level, which is the sub-shop level. No article surveillance shall be performed on an intermediate level, which in the present case is the shop level. Therefore it ma be considered to have another symbol, e.g. the bit string "111" for the shop-identifier SI that provides the information that the electronic article surveillance status is active but shall not be checked when receiving a zone information that comprises shopping-center-identifier and shop-identifier. This concept may also be applied to the highest level or the lowest level as desired. The symbol may be called "ignore symbol" because it allow to ignore a part of the received zone information.

Although an EEPROM was considered to realize the storage means 16 throughout the preceding description it can be considered to use a non volatile memory type, e.g. a one time programmable memory or even produce a representation of stored date by means of a laser for storing the zone data ZD in order to prevent them from being fraudulently manipulated. Regarding the status data SD it cane be mentioned that a fuse like structure may also be used as memory means 16 for storing these status data SD. The fuse shall be conductive when the data carrier 3 is produced and delivered to customer and may than be made non-conductive at the check out desk when the produced tagged by the data carrier 3 is purchased. A relatively strong magnetic and/or electric field can do making the fuse non-conductive.

The invention claimed is:

1. A circuit for a data carrier, wherein the data carrier comprises data carrier transmission means configured to perform a contact-less communication with a read/write station, wherein the circuit comprises interface means configured to cooperate with the data carrier transmission means, and wherein the circuit comprises storage means configured to store status data for indicating whether an electronic article surveillance status is active or not active and to store zone data for specifying at least one electronic article surveillance zone to which the electronic article surveillance status is assigned, and wherein the circuit comprises test means configured to receive from the interface means reception data, wherein the reception data are generate-able during a contact-less communication with the read/write station and wherein the reception data represent an electronic article surveillance status test-request command comprising test information, wherein the test information indicates an electronic article surveillance zone for which the electronic article surveillance status that is assigned to said indicated electronic article surveillance zone is to be tested, and to test whether the status data indicate that the electronic article surveillance status is active for the indicated electronic article surveillance zone, and, in the case that the electronic article surveillance status is active for the indicated electronic article surveillance zone, to generate test result representation data that represent that the electronic article surveillance status is active for the indicated electronic article surveillance zone, wherein the zone data is structured as a zone data field, wherein a first zone identifier is stored in a group of the most significant bits of the zone data field, wherein the first zone identifier identifies a first article surveillance zone at which the data carrier is located, wherein a second zone identifier is stored in a group of lower significant bits of the zone data field, wherein the second zone identifier identifies a second article surveillance zone at which the data carrier is located, wherein the second article surveillance zone contains the first article surveillance zone, wherein a third zone identifier is stored in a group of the least significant bits of the zone data field, wherein the third zone identifier identifies a third article surveillance zone at which the data carrier is located, wherein the third article surveillance zone contains the second article surveillance zone, wherein the first, second and third article surveillance zones are different from each other, and wherein the group of lower significant bits is positioned between the group of the most significant bits and the group of the least significant bits.

2. The circuit according to claim 1, wherein the test means are configured to release to the interface means response data corresponding to the test result representation data, wherein the response data represent that the electronic article surveillance status is active for the indicated electronic article surveillance zone and wherein the response date are intended to be communicated in a contact-less communication to the read/write station.

3. The circuit according to claim 1, wherein the test means are configured to decrypt at least that part of the reception data that is associated with the test information.

4. The circuit according to claim 1, wherein the zone data are configured to specify the at least one electronic article surveillance zone to be a sub-zone of another electronic article surveillance zone, and the test means are configured to detect that the test information indicates an electronic article surveillance zone to be a sub-zone of another electronic article surveillance zone and to test whether the status data indicate that the electronic article surveillance status is active for the indicated electronic article surveillance zone that is the sub-zone.

5. A data carrier, comprising data carrier transmission means, wherein the data carrier transmission means are configured to perform a contact-less communication with a read/write station, and a circuit for a data carrier according to claim 1.

6. A read-write station, comprising station transmission means configured to perform a contact-less communication with a data carrier, and transmission data generating means configured to generate and to release transmission data, wherein the transmission data represent an electronic article surveillance status test-request command comprising test information, wherein the test information indicates an electronic article surveillance zone for which an electronic article surveillance status that is assigned to said indicated electronic article surveillance zone is to be tested, and wherein the transmission data are intended to be communicated by the aid of the station transmission means in a contact-less communication to the data carrier, wherein zone data being structured as a zone data field is stored in a memory of the data carrier, wherein a first zone identifier is stored in a group of the most significant bits of the zone data field, wherein the first zone identifier identifies a first article surveillance zone at which the data carrier is located, wherein a second zone identifier is stored in a group of lower significant bits of the zone data field, wherein the second zone identifier identifies a second article surveillance zone at which the data carrier is located, wherein the second article surveillance zone contains the first article surveillance zone, wherein a third zone identifier is stored in a group of the least significant bits of the zone data field, wherein the third zone identifier identifies a third article surveillance zone at which the data carrier is located, wherein the third article surveillance zone contains the second article surveillance zone, wherein the first, second and third article surveillance zones are different from each other, and wherein the group of lower significant bits is positioned between the group of the most significant bits and the group of the least significant bits.

7. A read-write station according to claim 6, comprising evaluating means configured to receive a data signal taped at the station transmission means and to evaluate whether a data carrier has responded to the electronic article surveillance status test-request command by means of response data that are represented by said data signal.

8. A read-write station according to claim 6, wherein the transmission data generating means are configured to encrypt at least that part of the transmission data that represent the test information.

9. A read-write station according to claim 6, wherein the transmission data generating means are configured to provide the transmission data such that the test information indicates an electronic article surveillance zone to be a sub-zone of another electronic article surveillance zone.

10. An electronic article surveillance system comprising at least one read/write station according to claim 6.

11. A method of testing whether an electronic article surveillance status that is represented by means of status data stored in a data carrier is active, wherein the method comprises the following steps, namely: generating transmission data, wherein the transmission data represent an electronic article surveillance status test-request command comprising test information, wherein the test information indicates an electronic article surveillance zone for which an electronic article surveillance status that is assigned to said indicated electronic article surveillance zone is to be tested, and releasing said transmission data in a contact-less manner to the data carrier, wherein zone data being structured as a zone data field is stored in a memory of the data carrier, wherein a first zone identifier is stored in a group of the most significant bits of the zone data field, wherein the first zone identifier identifies a first article surveillance zone at which the data carrier is located, wherein a second zone identifier is stored in a group of lower significant bits of the zone data field, wherein the second zone identifier identifies a second article surveillance zone at which the data carrier is located, wherein the second article surveillance zone contains the first article surveillance zone, wherein a third zone identifier is stored in a group of the least significant bits of the zone data field, wherein the third zone identifier identifies a third article surveillance zone at which the data carrier is located, wherein the third article surveillance zone contains the second article surveillance zone, wherein the first, second and third article surveillance zones are different from each other, and wherein the group of lower significant bits is positioned between the group of the most significant bits and the group of the least significant bits.

12. The method according to claim 11, wherein the method comprises the step of evaluating whether the data carrier has responded to the electronic article surveillance status test-request command by means of response data that were communicated in a contact communication from the data carrier to the read/write station.

13. The method according to claim 11, wherein at least that part of the transmission data that represents the test information is encrypted.

14. The method according to claim 11, wherein generating the transmission data is performed in such a way that the test information indicates an electronic article surveillance zone to be a sub-zone of another electronic article surveillance zone.

15. A method of processing an electronic article surveillance status test-request command in a data carrier, wherein the data carrier stores status data for indicating whether an electronic article surveillance status is active or not active and zone data for specifying at least one electronic article surveillance zone to which the electronic article surveillance status is assigned, wherein the method comprises the following steps, namely storing the zone data in a memory of the data carrier, the zone data being structured as a zone data field, wherein storing the zone data comprises:

storing a first zone identifier in a group of the most significant bits of the zone data field, wherein the first zone identifier identifies a first article surveillance zone at which the data carrier is located;

storing a second zone identifier in a group of lower significant bits of the zone data field, wherein the second zone identifier identifies a second article surveillance zone at which the data carrier is located, and wherein the second article surveillance zone contains the first article surveillance zone; and storing a third zone identifier in a group of the least significant bits of the zone data field, wherein the third zone identifier identifies a third article surveillance zone at which the data carrier is located, wherein the third article surveillance zone contains the second article surveillance zone, wherein the first, second and third article surveillance zones are different from each other, wherein the group of lower significant groups of bits is positioned between the group of the most significant bits and the group of the least significant bits, receiving at the data carrier during a contact-less communication with a read/write station reception data, wherein the reception data represent an electronic article surveillance status test-request command comprising test information, wherein the test information indicates an electronic article surveillance zone for which the electronic article surveillance status that is assigned to said indicated electronic article surveillance zone is to be tested, testing whether the status data indicate that the electronic article surveillance status is active for the indicated electronic article surveillance zone, the testing comprising comparing the zone data stored in the memory of the data carrier with the test information, and, in the case that the electronic article surveillance status is active for the indicated electronic article surveillance zone, generating test result representation data that represent that the electronic article surveillance status is active for the indicated electronic article surveillance zone.

16. The method according to claim 15, wherein response data are generated and released, wherein the response data correspond to the test result representation data and represent that the electronic article surveillance status is active for the indicated electronic article surveillance zone and wherein the response data are intended to be communicated in a contact-less communication to the read/write station.

17. The method according to claim 15, wherein at least that part of the reception data that represents the test information is decrypted.

18. The method according to claim 15, wherein testing whether the status data indicate that the electronic article surveillance status is active for the indicated electronic article surveillance zone comprises detecting that the test information indicates an electronic article surveillance zone to be a sub-zone of another electronic article surveillance zone, and testing whether the status data indicate that the electronic article surveillance status is active for the indicated electronic article surveillance zone that is the sub-zone.

19. The method of operating an electronic article surveillance system, wherein the method comprises the steps of the method according to claim 11.

20. The method of claim 15, wherein storing the zone data further comprises setting the second zone identifier to a bit string composed of only ones, wherein comparing the zone data stored in the memory of the data carrier with the test information comprises comparing only the bits of the first zone identifier and the third zone identifier with the bits of the test information.

* * * * *